(12) United States Patent
Yao

(10) Patent No.: US 10,817,246 B2
(45) Date of Patent: Oct. 27, 2020

(54) DEACTIVATING A DISPLAY OF A SMART DISPLAY DEVICE BASED ON A SOUND-BASED MECHANISM

(71) Applicant: Baidu USA LLC, Sunnyvale, CA (US)

(72) Inventor: Xuchen Yao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/235,401

(22) Filed: Dec. 28, 2018

(65) Prior Publication Data

US 2020/0210139 A1 Jul. 2, 2020

(51) Int. Cl.
G06F 3/16 (2006.01)
G09G 5/00 (2006.01)
G06N 20/00 (2019.01)
G10L 25/51 (2013.01)

(52) U.S. Cl.
CPC .............. G06F 3/16 (2013.01); G06N 20/00 (2019.01); G09G 5/003 (2013.01); G10L 25/51 (2013.01); G09G 2330/027 (2013.01); G09G 2354/00 (2013.01)

(58) Field of Classification Search
CPC .... G06F 3/16; G09G 5/003; G09G 2330/027; G09G 2354/00; G10L 25/51; G06N 20/00
See application file for complete search history.

(56) References Cited

U.S. PATENT DOCUMENTS

| | | | | |
|---|---|---|---|---|
| 6,915,143 B2 * | 7/2005 | Kashu | ................. | H04W 52/027 455/560 |
| 10,170,135 B1 * | 1/2019 | Pearce | .................. | G06N 20/20 |
| 2010/0153101 A1 * | 6/2010 | Fernandes | ............... | G10L 17/26 704/220 |
| 2013/0080169 A1 * | 3/2013 | Harada | .................... | G10L 25/63 704/249 |
| 2013/0278837 A1 * | 10/2013 | Du | .......................... | G06F 3/017 348/734 |
| 2014/0049463 A1 * | 2/2014 | Seo | ....................... | G06F 1/1652 345/156 |
| 2014/0183269 A1 * | 7/2014 | Glaser | ..................... | G06F 21/32 235/492 |
| 2015/0221302 A1 * | 8/2015 | Han | ........................ | G10L 15/22 704/246 |
| 2016/0011768 A1 * | 1/2016 | Yim | ........................ | G10L 15/22 345/173 |
| 2016/0263437 A1 * | 9/2016 | Kow | ........................ | A61B 5/681 |
| 2017/0142533 A1 * | 5/2017 | Park | ........................ | H04R 27/00 |
| 2017/0220357 A1 * | 8/2017 | Choi | ...................... | G06F 9/4418 |
| 2017/0364324 A1 * | 12/2017 | Lee | ......................... | G06F 3/048 |
| 2018/0039368 A1 * | 2/2018 | Choi | ..................... | G06F 3/0416 |
| 2018/0082304 A1 * | 3/2018 | Summerlin | .......... | G06Q 20/325 |
| 2018/0268747 A1 * | 9/2018 | Braun | ..................... | G09F 13/12 |
| 2019/0179590 A1 * | 6/2019 | Jeong | .................... | G06F 3/1446 |
| 2019/0208322 A1 * | 7/2019 | Chapman | ................ | H04R 3/12 |
| 2019/0304448 A1 * | 10/2019 | Tang | ........................ | G10L 19/00 |

* cited by examiner

*Primary Examiner* — Ricardo Osorio

(74) *Attorney, Agent, or Firm* — Womble Bond Dickinson (US) LLP

(57) ABSTRACT

A signal corresponding to sound associated with the smart display device is received from a sound capture device. A machine learning model analyzes characteristics of the signal received from the sound capture device to determine whether to deactivate a display of the smart display device. In response to determining to deactivate the display of the smart display device based on the analysis, the display of the smart display device is deactivated.

17 Claims, 7 Drawing Sheets

DEACTIVATING A DISPLAY OF A SMART DISPLAY DEVICE BASED ON A SOUND-BASED MECHANISM

TECHNICAL FIELD

Embodiments of the invention relate generally to smart display devices. More particularly, embodiments of the invention relate to deactivating a display of a smart display device based on a sound-based mechanism.

BACKGROUND

Smart display devices, such as Google Home Smart Display or Amazon Echo Show, can be voice assistant smart speakers that include an integrated display or touchscreen display to present a user with information. Commands and instructions are provided to the smart device either through voice commands from a user of the smart display device or by physical inputs of commands via the touchscreen display. The display of the smart display device can then present a user with information via the display based on the received command.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
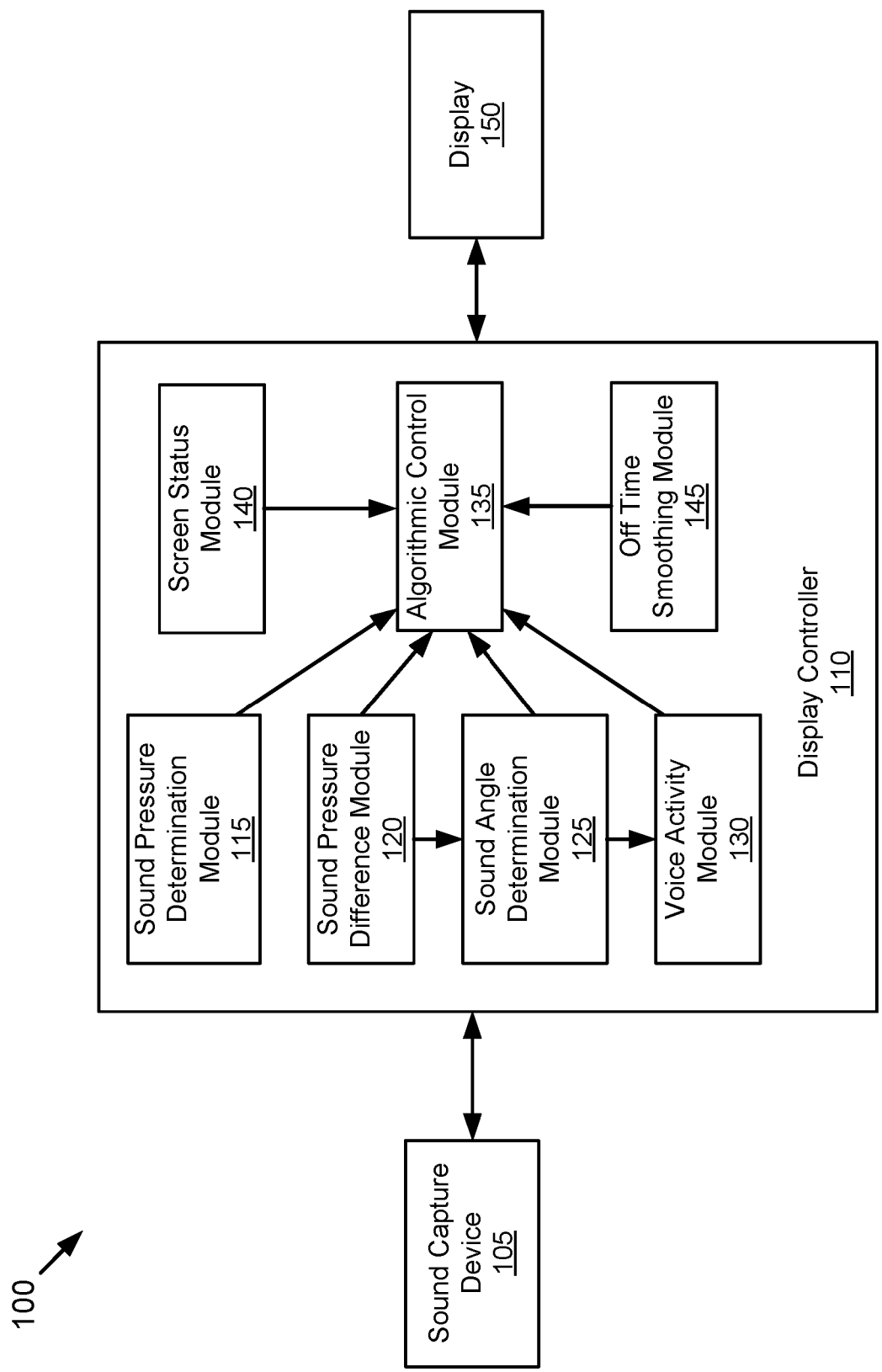
FIG. 1 is a block diagram illustrating an example of a display controller of a smart display device according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Accordingly, embodiments of the invention provide a smart display device that deactivates a display of the smart display device based on a sound-based mechanism. Normally, smart display devices do not deactivate their displays as long as the smart display device is powered on. A smart display device will typically continuously display information on the display, regardless of whether or not a user is present. However, in some instances a user of a smart display device may desire for the display of the smart display device to be deactivated (e.g., turned off). For example, a user may wish reduce the power consumption of the smart display device by turning off the display In another example, when a user leaves the house or goes to sleep they may wish to turn off the display. Accordingly, a user of the device may provide a voice command such as "screen off" or provide an input via a touchscreen of the smart display device that causes the display to deactivate. Such methods of deactivating the display of the smart display device are cumbersome, inefficient and may not be effective under certain circumstances.

Embodiments of the inventive system and methods provide a solution to this task by determining whether to deactivate a display of a smart display device based on a sound-based mechanism. A smart display device may include a sound capture device, such as a microphone, that can capture incoming sound from the surroundings of the smart display device and generate a signal corresponding to the captured sound. The sound capture device provides the signals corresponding to the incoming sound to a display controller of the smart display device.

The display controller analyzes characteristics of the signal to determine whether to deactivate a display of the smart display device using a machine learning model. Examples of characteristics that may be analyzed by the display controller include, but are not limited to, sound pressure, change in sound pressure, angle of a sound source relative to the smart display device and any voice activity included in the signal. The characteristics may be utilized as inputs for the machine learning model to determine whether or not to deactivate the display of the smart display device. If the machine learning model determines to deactivate the display based on the analysis of the characteristics, then the display controller may deactivate the display of the smart display device. For example, the display controller may transmit a signal to the display that causes the display to deactivate.

Accordingly, by using characteristics of the signal corresponding to sound captured by the sound capture device in a machine learning model, the display controller of the smart display device may intelligently determine when to deactivate the display of the smart display device, reducing the power consumption of the smart display device. Furthermore, by intelligently determining when to deactivate the display of the smart display device, a user may no longer be required to provide a voice command or physical input to deactivate the display, improving the user experience of the smart display device.

FIG. 1 is a block diagram illustrating an example of a display controller of a smart display device 100 according to one embodiment. Referring to FIG. 1, smart display device 100 includes, but is not limited to, display controller 110 operatively coupled to a sound capture device 105 and a display 150. Display controller 110 may be implemented in software, hardware, or a combination thereof. For example, at least some of the components of display controller 110 may be loaded into a memory (e.g., random access memory or RAM such as dynamic RAM or DRAM) and executed by processing logic of one or more processors (e.g., microprocessors such as central processing units or CPUs, or general-purpose processing units or GPUs) of smart display device 100 (not shown). Display 150 may be any type of display, such as a touch screen display, that is configured to receive signals from display controller 110 to activate and deactivate.

The sound capture device 105 may be configured to capture incoming sound, generate a signal based on the captured sound and transmit the signal to the display controller 110. In embodiments, sound capture device 105 may be a microphone operatively coupled to the display controller 110. In embodiments, sound capture device 105 may be a single microphone. In some embodiments, sound capture device 105 may be multiple microphones. For example, sound capture device 105 may be a microphone array that includes 2 to 8 microphones arranged in a linear, triangle, square or circular layout.

The display controller 110 may include a sound pressure determination module 115. The sound pressure determination module 115 may be configured to determine the sound pressure of the sound received by the sound capture device 105 utilizing the transmitted signal. In embodiments, the sound pressure determination module 115 may determine the sound pressure for multiple periods of time. In an embodiment, the sound pressure determination module 115 may determine distribution statistics associated with the determined sound pressure for the multiple periods of time. For example, the sound pressure determination module 115 may determine the mean and/or standard deviation of the sound pressure values for the multiple periods of time.

The display controller 110 may include a sound pressure difference module 120. The sound pressure difference module 120 may be configured to determine a difference between a current sound pressure level received by the sound capture device 105 and previously determined sound pressure levels. In embodiments, the sound pressure difference module may determine the difference between the current sound pressure level and a sound pressure level that was previously determined by the sound pressure determination module 115. For example, the sound pressure difference module 120 may determine a difference between a current sound pressure level and a mean value of the sound pressure for a period of time that was determined by the sound pressure determination module 115, as previously described.

The display controller 110 may further include a sound angle determination module 125. The sound angle determination module 125 may be configured to determine an angle of a source of the sound received by the sound capture device 105 relative to the sound capture device 105. For example, in embodiments, sound capture device 105 may include multiple microphones. The received signals corresponding to the sound from the multiple microphones may be compared with one another to determine an angle of the source of the sound relative to the multiple microphones.

The display controller 110 may include a voice activity module 130. The voice activity module 130 may be configured to determine whether the incoming sound includes voice activity based on the received signal. For example, the voice activity module 130 may determine whether the received signal includes a voice command for the smart display device 100. In embodiments, the voice activity module 130 may determine a confidence score that corresponds to the likelihood that the received signal includes voice activity. For example, the voice activity module 130 may determine a confidence score ranging from 0.0-1.0 that corresponds to the likelihood that the received signal includes voice activity, where 0.0 may represent the lowest likelihood that the received signal includes voice activity and 1.0 may represent the highest likelihood that the received signal includes voice activity.

In some embodiments, the voice activity module 130 may be configured to identify a particular user of a set of users associated with the incoming sound. Each user of the set of users may provide one or more voice samples to be utilized by the voice activity module 130 to subsequently identify voice commands from each user. For example, when user A provides a subsequent voice command to the smart display device 100, the voice activity module 130 may identify the voice command using the voice samples and determine that the voice command was provided by user A.

In embodiments, the sound pressure determination module 115, the sound pressure difference module 120, the sound angle determination module 125 and/or the voice activity module 130 can operate in parallel. In some embodiments, the sound pressure determination module 115, the sound pressure difference module 120, the sound angle determination module 125 and/or the voice activity module 130 can operate in series. For example, the sound pressure difference module 120 may provide data to the sound angle determination module 125 and the sound angle determination module 125 may provide data to the voice activity module 130.

The display controller 110 may include a screen status module 140. The screen status module 140 may be configured to provide an output that indicates whether the display 150 is activated (e.g., turned on) or deactivated (e.g., turned off). The display controller 110 may further include an off time smoothing module 145. The off time smoothing module 145 may be configured to determine how frequently display 150 is activated and/or deactivated.

The display controller 110 may further include an algorithmic control module 135. The algorithmic control module 135 may receive data from the sound pressure determination module 115, the sound pressure difference module 120, the sound angle determination module 125 and/or the voice activity module 130. The algorithmic control module 135 may be configured to determine whether to activate or deactivate the display 150 of the smart display device 100 based on the received data. In embodiments, the algorithmic control module 135 may utilize a machine learning model to determine whether to activate or deactivate the display 150 and determine a confidence score. In an embodiment, the machine learning model may be received from a remote server, as will be discussed in further detail at FIG. 2. Examples of machine learning models that may be utilized by the algorithmic control module 135 include, but are not limited to, linear models, non-linear models, shallow models and deep models. Upon the algorithmic control module 135 determining that the display 150 is to be activated/deactivated, the display controller 110 may deactivate the display 150 based on the determination by transmitting a signal to the display 150.

Figure 2:
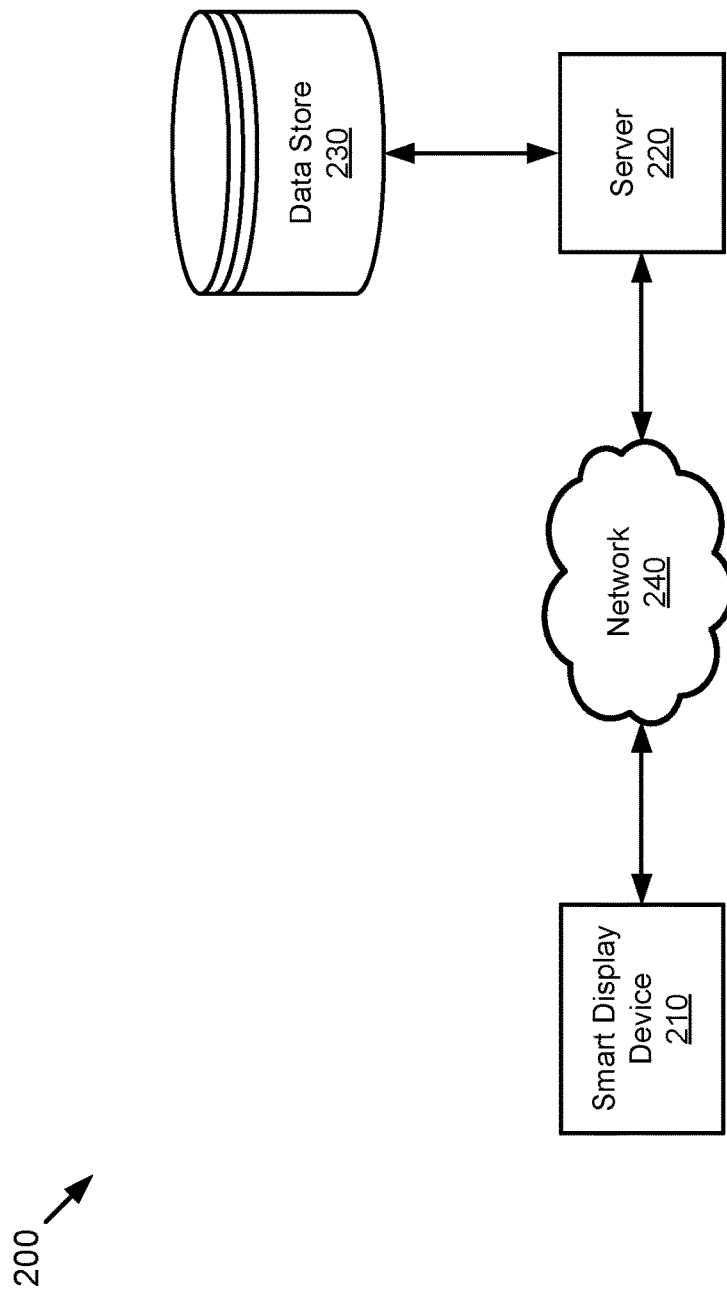
FIG. 2 is a block diagram illustrating a network configuration according to one embodiment.

FIG. 2 is a block diagram illustrating a network configuration 200 according to one embodiment. Referring to FIG. 2, network configuration 200 includes a smart display device 210 communicatively coupled to a server 220 over a network 240. Smart display device 210 may correspond to smart display device 100, as previously described at FIG. 1. Server 220 can be any server and may include one or more processing devices (not shown). Server 220 may be operatively coupled to a data store 230. The data store 230 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In embodiments, server 220 and data store 230 may be components of a cloud-based platform.

Network 240 may be a public network (e.g., the internet), a private network (e.g., a local area network (LAN) or wide area network (WAN)), or a combination thereof. In one embodiment, network 240 may include a wired or a wireless infrastructure, which may be provided by one or more wireless communications systems, such as a wireless fidelity (WiFi) hotspot connected with the network 240 and/or a wireless carrier system that can be implemented using various data processing equipment, communication towers (e.g. cell towers), etc.

Processing logic of the processing device of server 220 may be configured to train a machine learning model that is to be utilized by an algorithmic control module (e.g., algorithmic control module 135 of FIG. 1) of smart display device 210. Sample data not associated with the smart display device, such as previously acquired data from one or more different smart display devices, may be used as training sets for the machine learning model. The processing logic of server 220 may execute the machine learning model using the sample data and the outputs of the machine learning model may be analyzed to determine whether the machine learning model is functioning properly. After the machine learning model is trained by the processing logic, the machine learning model may be provided to the smart display device 210 via the network 240.

In some embodiments, upon receipt of the machine learning model, the algorithmic control module of smart display device 210 may utilize the machine learning model and characteristics associated with signals transmitted by sound capture device to determine whether or not to activate/deactivate a display of the smart display device. It should be noted that, in embodiments, the determination is performed by processing logic of the smart display device 210 without providing the characteristics associated with the images to server 220 via the network 240 to protect the privacy of users of smart display device 210.

Figure 3:
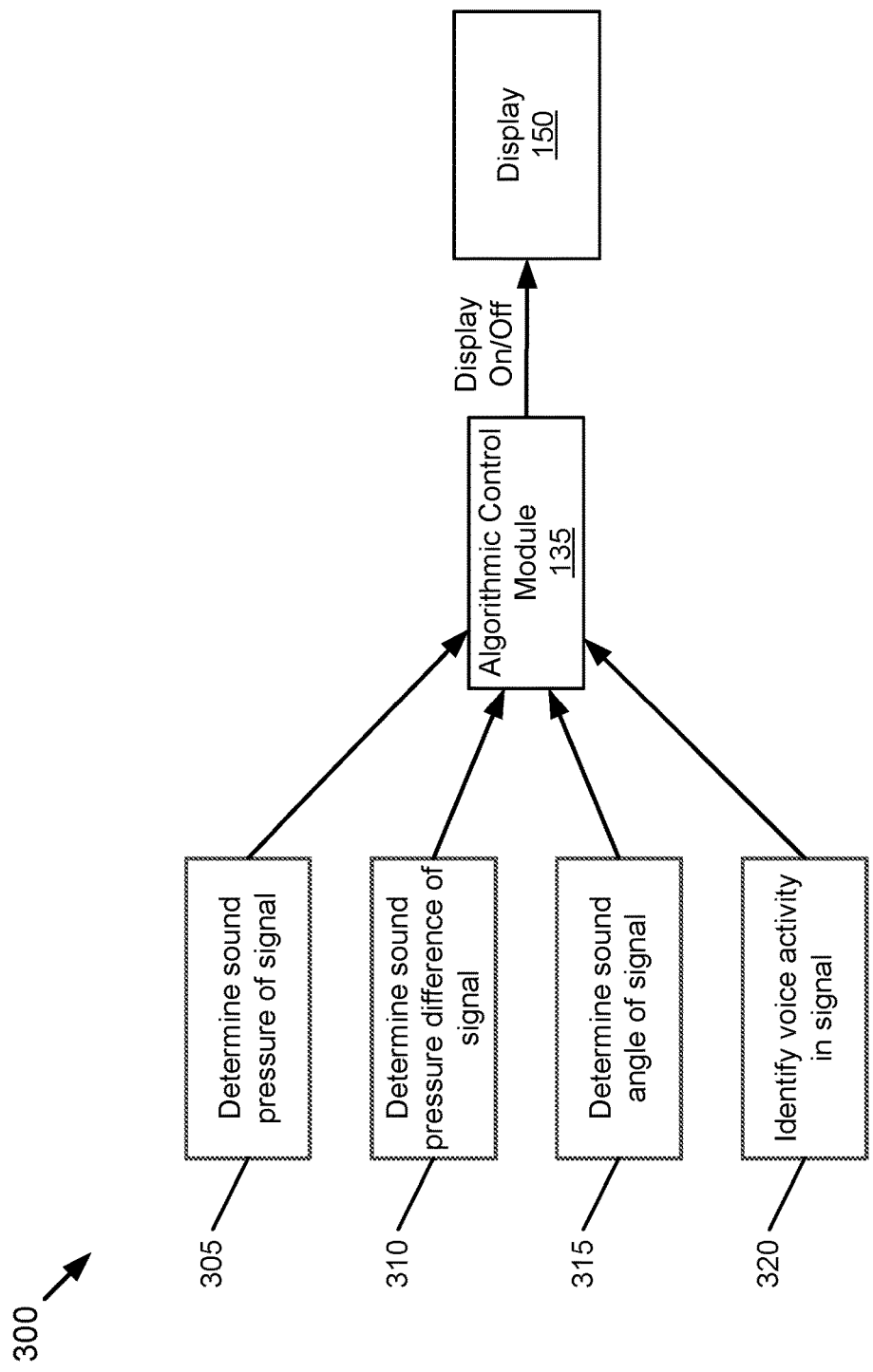
FIG. 3 is an illustration of an example of characteristics provided to an algorithmic control module to determine whether to deactivate a display of a smart display device in accordance with embodiments.

FIG. 3 is an illustration 300 of an example of characteristics provided to an algorithmic control module to determine whether to deactivate a display of a smart display device in accordance with embodiments. As previously described, characteristics associated with one or more signals received from a sound capture device may be provided to an algorithmic control module 135. The algorithmic control module 135 may use the characteristics as inputs to a machine learning model which may determine whether to deactivate display 150 of a smart display device. Each of the characteristics may influence the determination of the machine learning model on whether or not to deactivate display 150.

At block 305, a display controller may determine the sound pressure of the received signal, as previously described. The algorithmic control module 135 may utilize the sound pressure of the signal to determine whether or not to deactivate display 150. For example, if the sound pressure exceeds a threshold amount, indicating activity around the smart display device, the probability that the algorithmic control module 135 determines to deactivate display 150 may decrease. In embodiments, the display controller may determine distribution statistics, such as the mean and standard deviation, for the received signals over periods of time. For example, the display controller may determine that during the previous night the mean sound pressure was 50 decibels (dB) and the standard deviation was 3 dB, during the previous day the mean sound pressure is 70 dB and the standard deviation is 6 dB, during the previous 10 minutes the mean sound pressure was 65 dB and the standard deviation was 4 dB and during the previous hour the mean sound pressure was 65 dB and the standard deviation was 5 dB. In some embodiments, the display controller may utilize the distribution statistics to determine whether or not to deactivate the display 150 of the smart display device. For example, if a current sound pressure exceeds a determined standard deviation from the mean, then the probability that the display controller determines to deactivate the display 150 may decrease.

At block 310, the display controller may determine the sound pressure difference of the received signal from the sound capture device and previous sound pressure levels. The algorithmic control module 135 may utilize the difference in sound pressure levels to determine whether or not to deactivate display 150. For example, if the difference between a current sound pressure level and a previous sound pressure level exceeds a threshold, the probability that the algorithmic control module 135 determines to deactivate display 150 may decrease. However, if the difference between a current sound pressure level and a previous sound pressure level is below a threshold, the probability that the algorithmic control module 135 determines to deactivate display 150 may increase.

At block 315, the display controller may determine the sound angle of the received signal from the sound capture device. The sound angle may correspond to an angle of a sound source relative to the sound capture device or smart display device. The algorithmic control module 135 may utilize the sound angle to determine whether or not to deactivate display 150. For example, if the sound angle indicates that the sound source is in front of the smart display device, the probability that the algorithmic control module 135 determines to deactivate display 150 may decrease. However, if the sound angle indicates that the sound source is behind the smart display device, the probability that the algorithmic control module 135 determines to deactivate display 150 may increase. Further detail with regards to the utilization of sound angle in determining whether to deactivate the display 150 will be described at FIG. 5 below.

At block 320, the display controller may identify voice activity in the received signal. The algorithmic control module 135 may utilize the voice activity in a signal to determine whether or not to deactivate display 150. For example, if the received signal includes voice activity, then the probability that the algorithmic control module 135 determines to deactivate the display 150 may decrease. However, if the received signal does not include voice activity, then the probability that the algorithmic control module 135 determines to deactivate the display 150 may increase.

It should be noted that although illustration 300 includes characteristics at blocks 305, 310, 315 and 320 being utilized to determine whether or not to deactivate display 150, in embodiments more or less characteristics may be utilized to determine whether or not to deactivate display 150.

Figure 4:
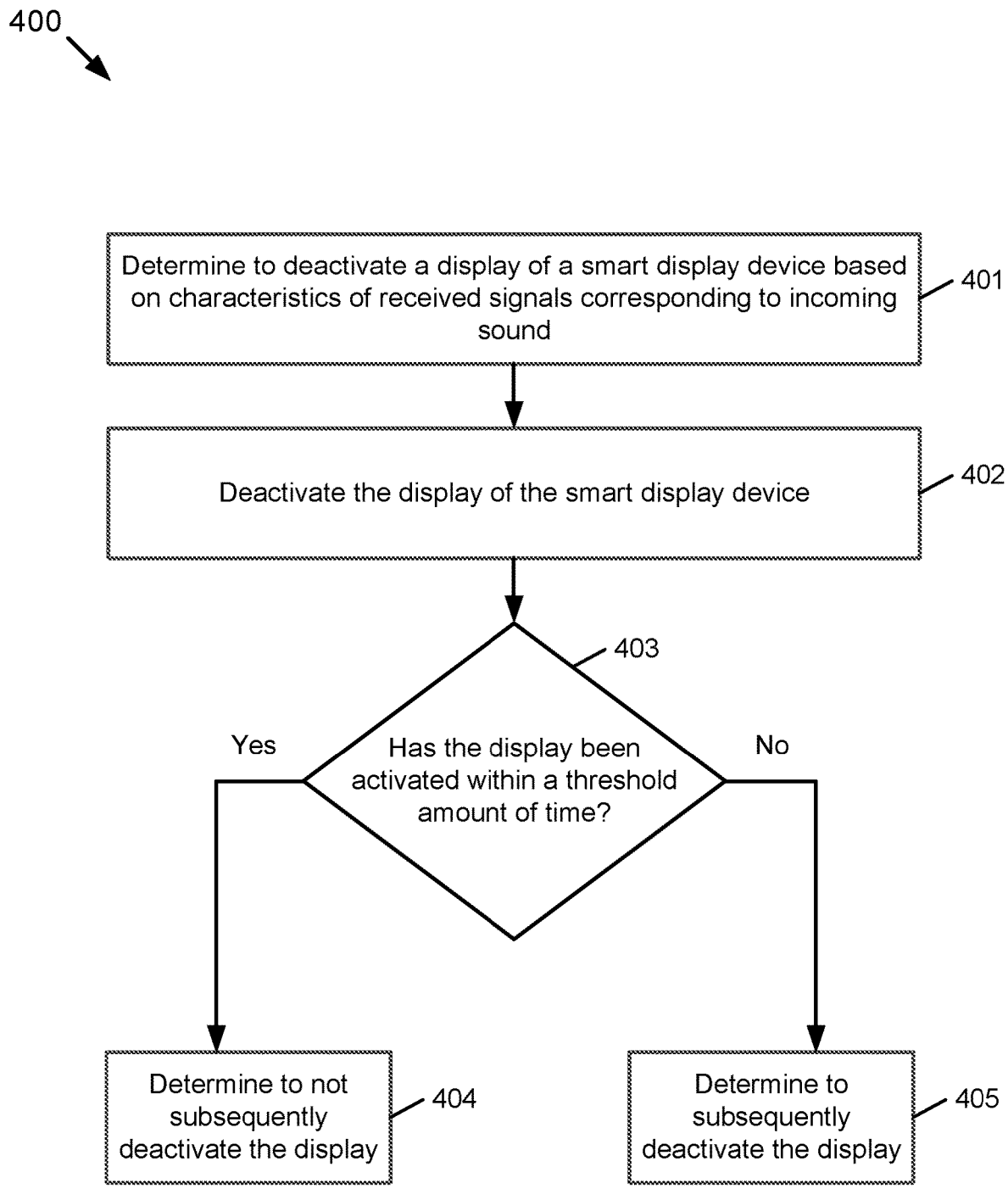
FIG. 4 is a flow diagram illustrating a process of display off time smoothing according to one embodiment.

FIG. 4 is a flow diagram illustrating a process 400 of display off time smoothing according to one embodiment. Process 400 may be performed by processing logic which may include software, hardware, or a combination thereof. For example, one or more operations of process 400 may be performed by the off time smoothing module 145 of display controller 110 of FIG. 1.

Referring to FIG. 4, in operation 401, processing logic determines to deactivate a display of a smart display device based on characteristics of received signals corresponding to incoming sound, as previously described. In operation 402, processing logic deactivates the display of the smart display device.

In operation 403, the processing logic determines if the display has been activated within a threshold amount of time of the deactivation of the display at operation 402. For example, the processing logic may determine if the display has been activated by a user within a five minute threshold amount of time since the deactivation of the display at operation 402. A user activating the display within the threshold amount of time may indicate that the processing logic determined to deactivate the display at an inappropriate time. Accordingly, to prevent deactivation of the display at an inappropriate time, at operation 404, if the display has been activated within the threshold amount of time, the processing logic determines to not subsequently deactivate the display. In embodiments, the processing logic may determine to not subsequently deactivate the display for a period of time. For example, the processing logic may determine to not subsequently deactivate the display for one hour.

If the display has not been activated within a threshold amount of time, at operation 405 the processing logic determines to subsequently deactivate the display. In some embodiments, data associated with the determinations as previously described in process 400 may be provided to the algorithmic control module 135. The data may be utilized by a machine learning model to determine whether or not to deactivate the display of the smart display device, as previously described.

Figure 5:
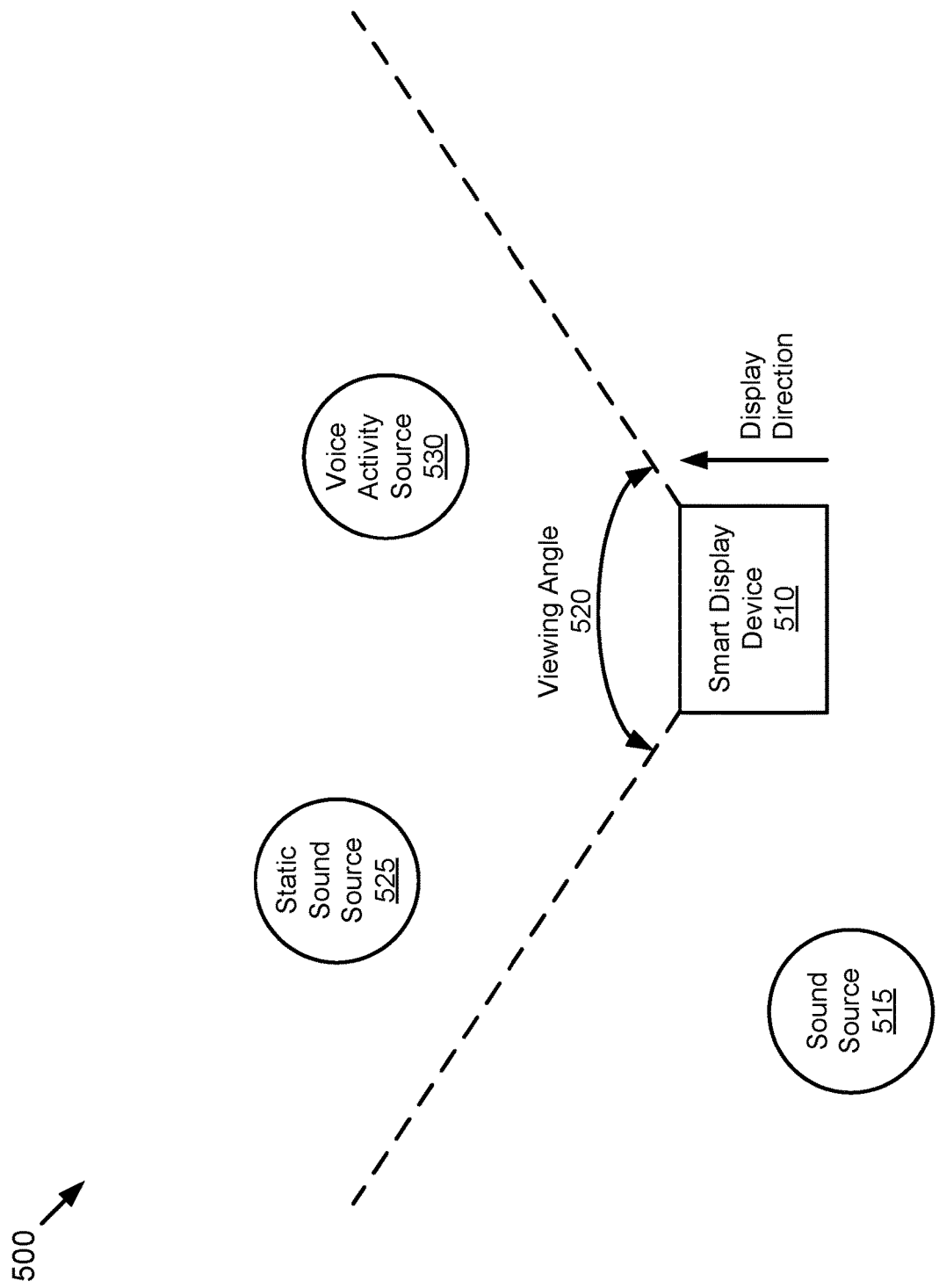
FIG. 5 is an illustration of an example of utilizing sound angles of multiple sound sources to determine whether to deactivate a display of a smart display device in accordance with embodiments.

FIG. 5 is an illustration 500 of an example of utilizing sound angles of multiple sound sources to determine whether to deactivate a display of a smart display device in accordance with embodiments. As previously described, sound angles associated with one or more sound sources may be determined by a sound angle determination module 125 and provided to an algorithmic control module 135. The algorithmic control module 135 may use the sound angles as inputs to a machine learning model which may determine whether to deactivate display 150 of a smart display device.

Illustration 500 includes a smart display device 510 that may correspond to smart display device 100 of FIG. 1. Smart display device 510 includes a display (not shown) with a display direction towards the top of FIG. 5. The display may have a viewing angle 520 that corresponds to a range of angles that the display of the smart display device 510 is visible. In embodiments, if the determined sound angle for a particular sound source is determined to be within the viewing angle 520, then the probability that a display controller (not shown) of the smart display device 510 determines to deactivate the display may decrease.

Illustration 500 may further include a sound source 515, a static sound source 525 and a voice activity source 530. Each of sound source 515, static sound source 525 and voice activity source 530 may generate a sound that is received by a sound capture device, as previously described.

Referring to FIG. 5, smart display device 510 may receive an incoming sound from sound source 515 and determine a sound angle associated with sound source 515. In FIG. 5, sound source 515 is located outside of viewing angle 520. Since the sound source 515 is located outside of viewing angle 520, the probability that the display controller of the smart display device 510 determines to deactivate the display may increase.

Smart display device 510 may receive an incoming sound from static sound source 525 and determine a sound angle associated with static sound source 525. In FIG. 5, static sound source 525 is located within viewing angle 520. Since the static sound source 525 is located within the viewing angle 520, the probability that the display controller of the smart display device 510 determines to deactivate the display may decrease. However, the display controller may determine over a period of time that the sound angle of the static sound source 525 may remain relatively constant. The sound angle of static sound source 525 remaining constant may indicate that the sounds generated by static sound source 525 may not correspond to user activity, but may be the result of some other object, such as a television, radio or other similar device. Accordingly, in some embodiments, upon identifying the sound angle of static sound source 525 as remaining relatively constant over a period of time, the display controller may incline to disregard incoming sounds from static sound source 525 when determining whether to deactivate the display of smart display device 510.

Smart display device 510 may receive an incoming sound from voice activity source 530. In FIG. 5, voice activity source is located within viewing angle 520. Since the voice activity source 530 is located within viewing angle 520, indicating that the voice activity source 530 is likely using the smart display device 510, the probability that the display controller of the smart display device 510 determines to deactivate the display may decrease. In embodiments, a confidence level may be utilized. For example, if voice activity source 530 has an associated confidence level of 0.1 (e.g., a lower likelihood of voice activity), then the probability that the display controller of the smart display device 510 determines to deactivate the display may increase compared to a voice activity source having a higher confidence level (e.g., a higher likelihood of voice activity). In some embodiments, the location of the voice activity source 530 within the viewing angle 520 may also be determined by the display controller. For example, if the voice activity source 530 is located directly in front of the smart display device 510, then the probability that the display controller determines to deactivate the display may decrease. However, if the voice activity source 530 is located on the periphery of the viewing angle 520, then the probability that the display controller determines to deactivate the display may increase.

Figure 6:
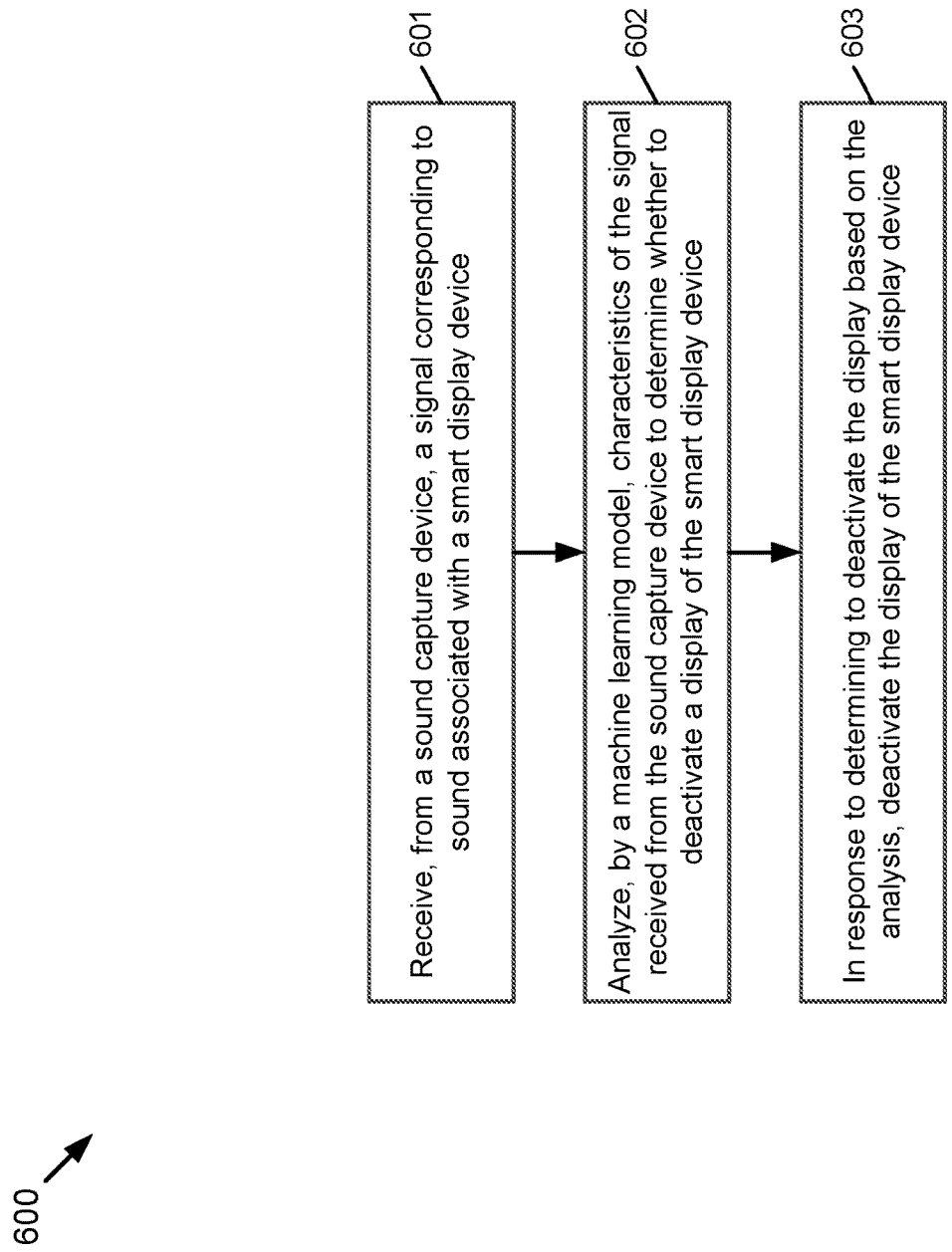
FIG. 6 is a flow diagram illustrating a process of determining to deactivate a display of a smart display device based on characteristics of a signal associated with an incoming sound according to one embodiment.

FIG. 6 is a flow diagram illustrating a process 600 of determining to deactivate a display of a smart display device based on characteristics of a signal associated with an incoming sound according to one embodiment. Process 600 may be performed by processing logic which may include software, hardware, or a combination thereof. For example, process 600 may be performed by display controller 110 of FIG. 1. Referring to FIG. 6, in operation 601, processing logic receives, from a sound capture device, a signal corresponding to sound associated with a smart display device. In operation 602, processing logic executing a machine learning model analyzes characteristics of the signal received from the sound capture device to determine whether to deactivate the display of the smart device. In operation 603, in response to determining to deactivate the display based on the analysis, processing logic deactivates the display of the smart display device.

Figure 7:
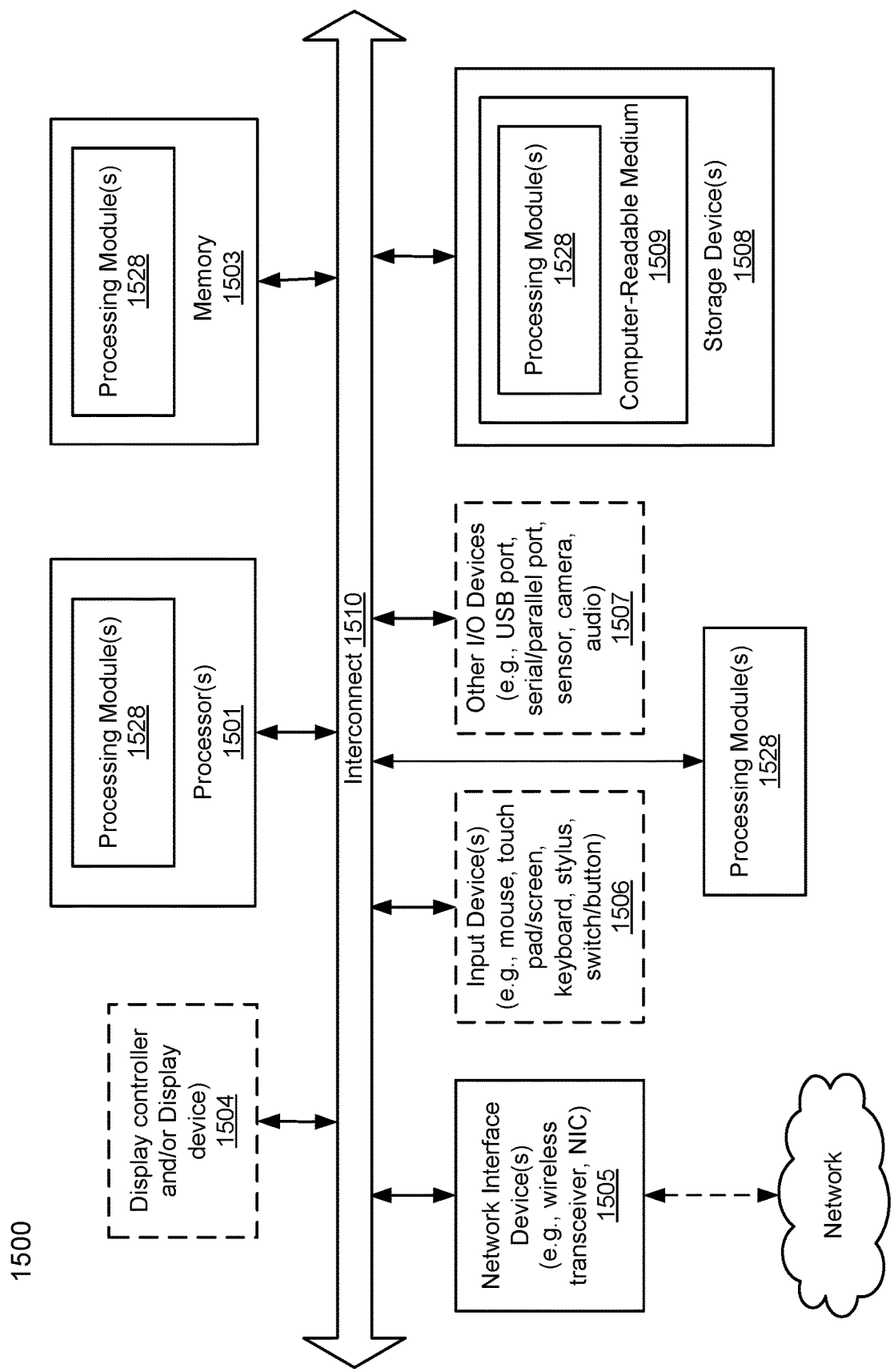
FIG. 7 is a block diagram illustrating a data processing system according to one embodiment.

FIG. 7 is a block diagram illustrating an example of a data processing system which may be used with one embodiment of the invention. For example, system 1500 may represent any of data processing systems described above performing any of the processes or methods described above, such as, for example, a client device or a server described above, such as, for example, smart display device 100 of FIG. 1 as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, display controller 110 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for control of a smart display device based on characteristics, the method comprising:

receiving, from a sound capture device, a signal corresponding to sound associated with the smart display device;

analyzing, by a processing device executing a machine learning model, a plurality of characteristics of the signal received from the sound capture device to determine whether to deactivate a display of the smart display device, wherein the plurality of characteristics comprise sound pressure associated with the signal and wherein analyzing the plurality of characteristics comprises determining a mean and a standard deviation associated with the sound pressure; and in response to determining to deactivate the display of the smart display device based on the analysis, deactivating the display of the smart display device.

2. The method of claim 1, wherein the machine learning model is trained at a remote server using secondary data not associated with the smart display device.

3. The method of claim 1, wherein the plurality of characteristics comprise at least one of a sound angle associated with the signal or voice activity associated with the signal.

4. The method of claim 3, wherein analyzing the plurality of characteristics of the signal received from the sound capture device to determine whether to deactivate the display of the smart display device comprises:

determining an angle of a source of the sound relative to the smart display device.

5. The method of claim 1, wherein analyzing the plurality of characteristics of the signal received from the sound capture device to determine whether to deactivate the display of the smart display device comprises:

determining a difference between the sound pressure associated with the signal and a previous sound pressure associated with the smart display device.

6. The method of claim 1, further comprising:
identifying a user associated with the sound from a plurality of users based on the received signal.

7. A non-transitory machine-readable medium having instructions stored therein, which when executed by a processor, cause the processor to perform operations, the operations comprising:

receiving, from a sound capture device, a signal corresponding to sound associated with a smart display device;

analyzing, by a machine learning model, a plurality of characteristics of the signal received from the sound capture device to determine whether to deactivate a display of the smart display device, wherein the plurality of characteristics comprise sound pressure associated with the signal and wherein analyzing the plurality of characteristics comprises determining a mean and a standard deviation associated with the sound pressure; and in response to determining to deactivate the display of the smart display device based on the analysis, deactivating the display of the smart display device.

8. The non-transitory machine-readable medium of claim 7, wherein the machine learning model is trained at a remote server using secondary data not associated with the smart display device.

9. The non-transitory machine-readable medium of claim 7, wherein the plurality of characteristics comprise at least one of a sound angle associated with the signal or voice activity associated with the signal.

10. The non-transitory machine-readable medium of claim 9, wherein analyzing the plurality of characteristics of the signal received from the sound capture device to determine whether to deactivate the display of the smart display device comprises:

determining an angle of a source of the sound relative to the smart display device.

11. The non-transitory machine-readable medium of claim 7, wherein analyzing the plurality of characteristics of the signal received from the sound capture device to determine whether to deactivate the display of the smart display device comprises:

determining a difference between the sound pressure associated with the signal and a previous sound pressure associated with the smart display device.

12. The non-transitory machine-readable medium of claim 7, further comprising:

identifying a user associated with the sound from a plurality of users based on the received signal.

13. A system, comprising:
a processor; and
a memory coupled to the processor to store instructions, which when executed by the processor, cause the processor to perform operations, the operations including:

receiving, from a sound capture device, a signal corresponding to sound associated with a smart display device;

analyzing, by a processing device executing a machine learning model, a plurality of characteristics of the signal received from the sound capture device to determine whether to deactivate a display of the smart display device, wherein the plurality of characteristics comprise sound pressure associated with the signal and wherein analyzing the plurality of characteristics comprises determining a mean and a standard deviation associated with the sound pressure; and in response to determining to deactivate the display of the smart display device based on the analysis, deactivating the display of the smart display device.

14. The system of claim 13, wherein the machine learning model is trained at a remote server using secondary data not associated with the smart display device.

15. The system of claim 13, wherein the plurality of characteristics comprise at least one of a sound angle associated with the signal or voice activity associated with the signal.

16. The system of claim 15, wherein analyzing the plurality of characteristics of the signal received from the sound capture device to determine whether to deactivate the display of the smart display device comprises:

determining an angle of a source of the sound relative to the smart display device.

17. The system of claim 13, wherein analyzing the plurality of characteristics of the signal received from the sound capture device to determine whether to deactivate the display of the smart display device comprises:

determining a difference between the sound pressure associated with the signal and a previous sound pressure associated with the smart display device.

* * * * *